W. CROSSLEY.
SEED PLANTER AND FERTILIZER.
APPLICATION FILED NOV. 5, 1917.

1,261,216.

Patented Apr. 2, 1918.
2 SHEETS—SHEET 1.

Inventor
William Crossley.

By his Attorney
Stanley Lightfoot.

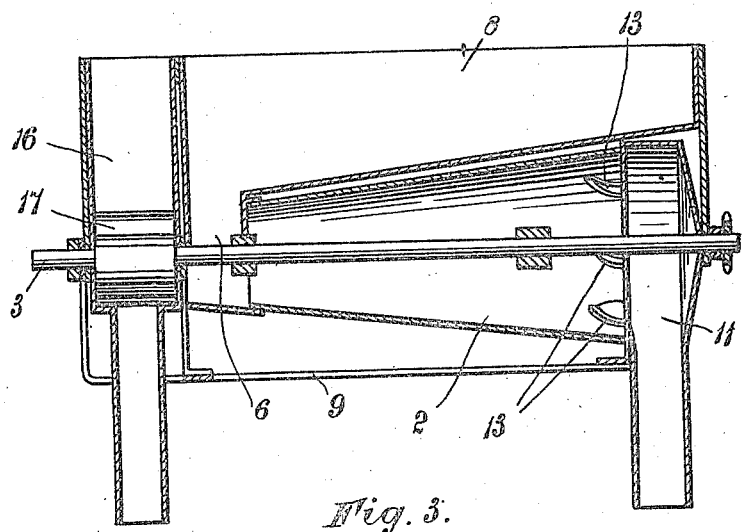
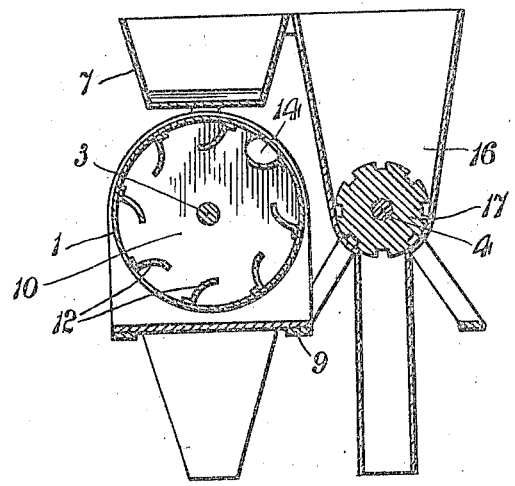

UNITED STATES PATENT OFFICE.

WILLIAM CROSSLEY, OF TORONTO, ONTARIO, CANADA, ASSIGNOR OF ONE-HALF TO CHARLES SOMERS, JR., OF TORONTO, CANADA.

SEED-PLANTER AND FERTILIZER.

1,261,216.

Specification of Letters Patent. Patented Apr. 2, 1918.

Application filed November 5, 1917. Serial No. 200,473.

*To all whom it may concern:*

Be it known that I, WILLIAM CROSSLEY, of the city of Toronto, in the county of York, in the Province of Ontario, in the Dominion of Canada, have invented certain new and useful Improvements in Seed-Planters and Fertilizers, and do hereby declare that the following is a full, clear, and exact description of same.

This invention relates to potato or other seed planters, and has for its objects to provide a preferably portable machine for this purpose of cheap and simple construction which may be self-contained or which may be attachable to suitable existing farm implements, and which may be further applicable for fertilizing purposes or for both planting and fertilizing, as may be necessary or desirable.

Further objects subsidiary to or resulting from the above-mentioned objects or from the construction of the invention as it may be carried into effect will become apparent as the said invention is hereinafter further disclosed.

By way of example, the said invention may be carried into effect by the novel construction and arrangement of parts whereby conical drums are mounted in a suitable frame, the lower part of which frame may be adapted to be attached to any suitable existing farm implement or may form part of a supporting structure specially provided therefor, the axes of the said drums being parallel and with their apices reversed so that the larger ends of the said conical drums will face in opposite directions. A seed hopper is superimposed above each drum, each hopper being provided with a chute or outlet which feeds the smaller end of its respective drum, and at the larger ends of the drums are arranged a series of seed-selecting scoops adapted to move, by the rotation of the drums, in proximity to one of the walls of a compartment into which the seed or seed pieces may be ejected from the said scoops, during revolution of the drums, through suitable orifices in the said compartment walls, which orifices are situated in a plane above the axes of the drums whereby the seed or seed pieces do not enter the compartment until elevated by the scoops to a substantial extent which is above the normal level of the seed pieces in the body of the drums. An outlet is, of course, provided from each seed compartment to permit the seed pieces to fall to the ground, and suitable driving gear is also provided which may be operated from the wheels of the implement upon which the device is mounted, or in such other desirable manner, a clutch being preferably arranged to effect the control of the operation of the drums. In proximity to the smaller end of each of the said drums is a further fertilizer hopper having a suitable outlet therefrom and accommodating a controlling disk or wheel recessed or otherwise adapted by its configuration and relation to the hopper to control the flow of fertilizer therefrom so that while the drums are working the fertilizer may be fed from the fertilizer hoppers at a frequency and to an extent conforming to the operations of the planters; and it is preferable that the parts should be arranged respectively so that the fertilizer controlled by the one drum axle will work in conjunction with the planter controlled by the other axle, all of which is more particularly ascertained in and by the following specification having reference to the accompanying drawings, in which—

Fig. 3 is a vertical section of the same taken on the line $3^\times$—$3^\times$ Fig. 2;

Fig. 4 is a transverse vertical section taken on the line $4^\times$—$4^\times$ Fig. 2.

Similar characters of reference indicate similar parts in the several figures of the drawings.

Figure 1:
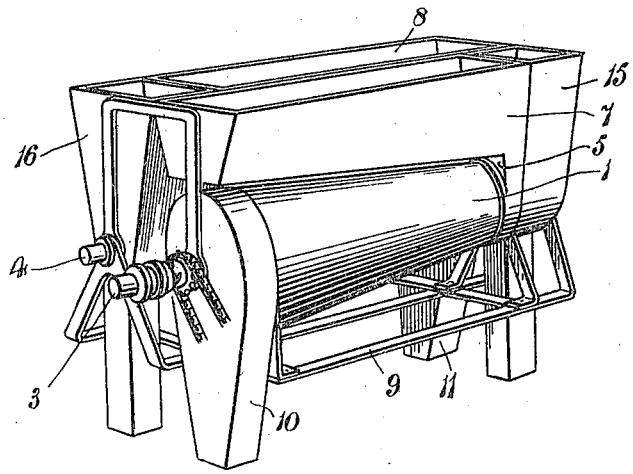
Figure 1 illustrates, in perspective, a view of a planter and fertilizer constructed in accordance with this invention.
Figure 2:
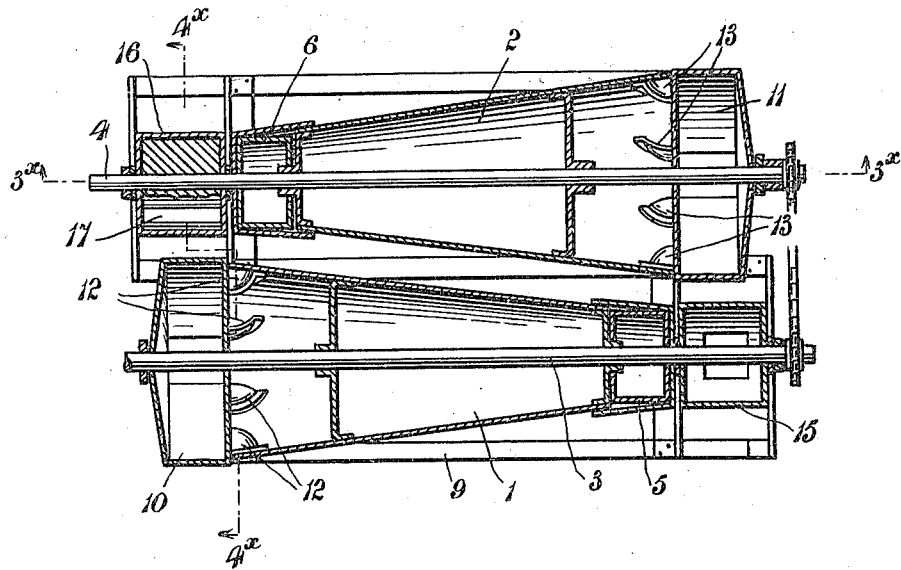
Fig. 2 is a sectional plan of the same taken through the axes of the drums.

In the example illustrated, 1 and 2 are conical drums mounted upon shafts or axles 3 and 4 respectively, the said drums being open at both ends with their larger ends facing in opposite directions, as shown in Fig. 2 of the drawings, and their smaller ends having the mouths 5 and 6 of hoppers 7 and 8 respectively associated therewith in such a manner that the seed drums 1 and 2 will be fed from said hoppers to a proportion of their capacity. 9 is a frame carrying the planter proper which may be adapted to be secured to any suitable truck or farm implement, or may form a permanent part of such truck or implement, as may be necessary or desirable. 10 and 11 are box-like compartments each provided with an outlet at its lower end from which the potatoes or seed pieces are dropped from the machine, and 12—12 and 13—13 are a series of scoops at or near the periphery of the large end of each of the said drums respectively, adapted by their configuration to pick up during the rotation of the drums a required number of seed pieces and carry them upwardly in contact with the walls of the compartment contiguous to the said drums, and it will be understood that the seed scoops may be of a permanent nature or they may be detachable, if desired, so that various sizes of scoops may be used in the machine, according to requirements. Each of the compartments 10 and 11 is provided with an orifice communicating with its respective drum, such as that indicated by the numeral 14 in Fig. 4, through which orifice the seed pieces may drop from the scoops as they pass the same in succession, said orifices being located substantially above the normal level of the potatoes or seed pieces in the drums, so that only those seed pieces which are elevated by the scoops will pass therethrough.

15 and 16 are fertilizer hoppers arranged at the smaller end of the said drums, through which pass the axles 3 and 4 respectively, which said axles may effect the operation within each of the said fertilizer hoppers of means to control the flow of the fertilizer from the said hoppers to an extent conforming with the speed at which the seed pieces are being dropped from the delivery compartment of the machine hereinbefore referred to.

In the drawings 17 is a peripherally recessed rotary cylinder accommodated in the lower part of the hopper and normally closing the outlet therefrom whereby upon the rotation of the said cylinder the fertilizer will be carried by the recesses therein to the hopper outlet in the required quantity and frequency.

In Fig. 2 of the drawings the hopper 15 is shown without the controlling cylinder therein, while such a cylinder is shown in the hopper 16. The arrangement shown is desirable for the reason that the compartment 10 and fertilizer hopper 16 move approximately in the same plane as the machine is drawn along the furrow, this being also the case with the compartment 11 and hopper 15 so that the hopper 16 would coöperate with the planting device carried and operated by the axle 3 in providing for both the planting and fertilizing of the seed in one furrow, while the hopper 15 would coöperate with the device carried by the axle 4 in effecting the planting and fertilizing in a furrow parallel to the one already referred to, suitable means being provided to effect the necessary rotation of the axles, such as by the coupling of one axle, to the wheel of the truck or the like upon which the device is mounted, and also operably coupling the axles one to another, or they may be driven independently and provided with such controlling mechanism as may be necessary or desirable, according to the conditions under which the machine is intended to be used.

A device of the type described may be very simply constructed while being efficient in its operation, and although the drums are illustrated and referred to as being conical, it will be understood that a similar result may be obtained by the use of cylindrical drums tilted toward the outlet ends thereof.

This invention may be developed within the scope of the following claims without departing from the essential features thereof, and it is desired that the specification and drawings be read as being merely illustrative and not in a limiting sense, except as necessitated by the prior art.

What I claim as my invention is:—

1. In a seed planter, the combination with a rotatably-mounted conical drum to which seed is fed at the smaller end, of a delivery compartment contiguous to the larger end of said drum, a partition between said compartment and said drum, said partition being orificed above the axis of said drum, and a plurality of scoops arranged in proximity to the periphery of the larger end of said drum to elevate to and eject said seed through said orifice.

2. In a device of the class described, conical seed-selecting drums disposed on parallel axles, with the larger end of one drum adjacent to the smaller end of the other, scoops within said drums to effect the seed selection, compartments arranged contiguously to the larger ends of said drums to receive seed from said scoops when elevated thereby to a predetermined extent, and fertilizer feeding mechanism disposed at the opposite ends of said drums and controlled by the axles operating said drums.

3. In a device of the class described, a seed-selecting drum operatively mounted upon a shaft, a fertilizing device arranged at the end of said drum remote from the delivery end thereof, a further seed-selecting drum mounted upon a shaft parallel to said first-mentioned shaft, but having its delivery end disposed adjacent to the receiving end of said first-mentioned drum, and a further fertilizing device arranged in axial alignment with said drum whereby the delivery end of each of said drums is in proximity to the fertilizing device in alignment with the other of said drums.

4. In a device of the class described, conical seed-selecting drums disposed on parallel axles, with the larger end of one drum adjacent to the smaller end of the other, scoops within said drums to effect the seed-selection, compartments arranged contiguously to the larger ends of said drums to receive seed from the seed scoops when elevated thereby to a predetermined extent, a fertilizer hopper arranged at the opposite ends of said drums and a rotatable member within each of said hoppers and operated by said axles, said rotatable member having a plurality of peripheral recesses therein to control the extent and frequency of the fertilizer delivery.

5. In a device of the class described, a seed-selecting drum operatively mounted upon a shaft, a fertilizer hopper arranged at the end of said drum remote from the delivery end thereof, a further seed-selecting drum mounted upon a shaft parallel to said first-mentioned shaft, but having its delivery end disposed adjacent to the receiving end of said first-mentioned drum, a further fertilizer hopper arranged at the end of said last-mentioned drum adjacent the delivery end of said first-mentioned drum, and a rotatable member within each of said hoppers and operated by said axles, said rotatable member having a plurality of peripheral recesses therein to control the extent and frequency of the fertilizer delivery.

Signed at the city of Toronto, county of York, Province of Ontario, Dominion of Canada, this 30th day of October, 1917.

WILLIAM CROSSLEY.